June 23, 1970
A. J. MIKOS
3,516,096
SOFA BED
Original Filed July 26, 1968
11 Sheets-Sheet 1
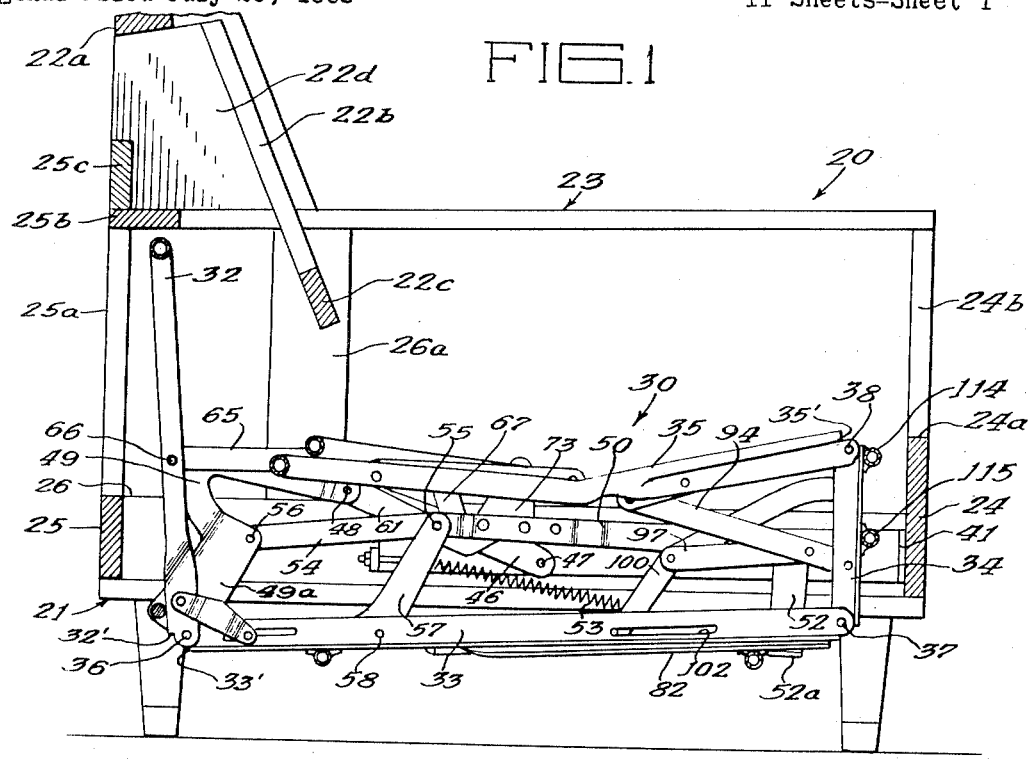
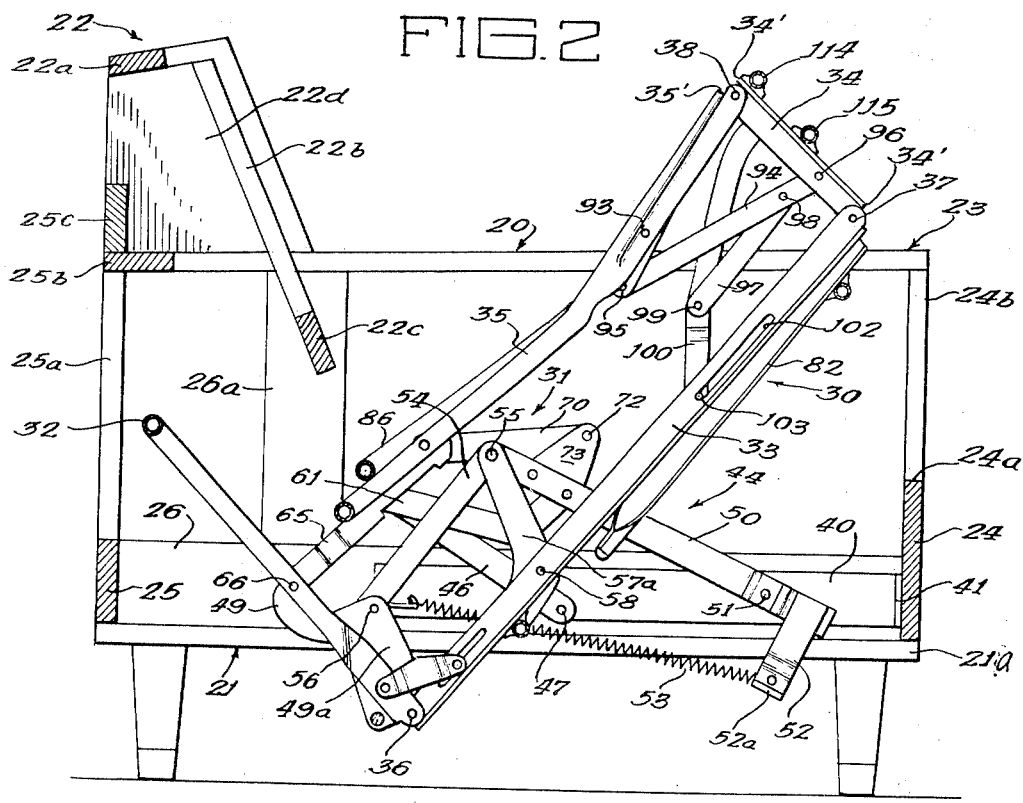
Inventor:
Aloysius J. Mikos
By: Hofgren, Wegner, Allen,
Stellman & McCord
Attorneys June 23, 1970     A. J. MIKOS     3,516,096
SOFA BED
Original Filed July 26, 1968     11 Sheets-Sheet 2
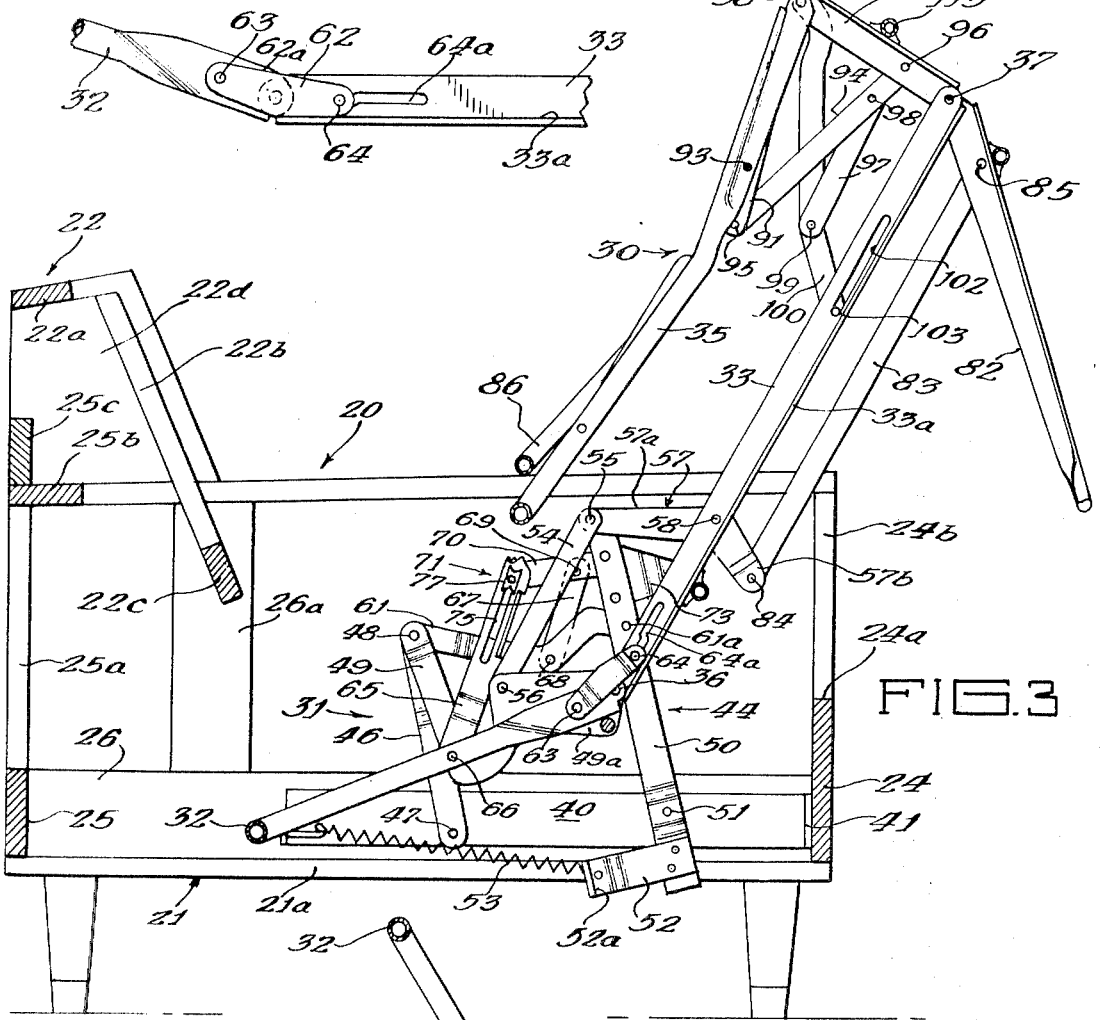
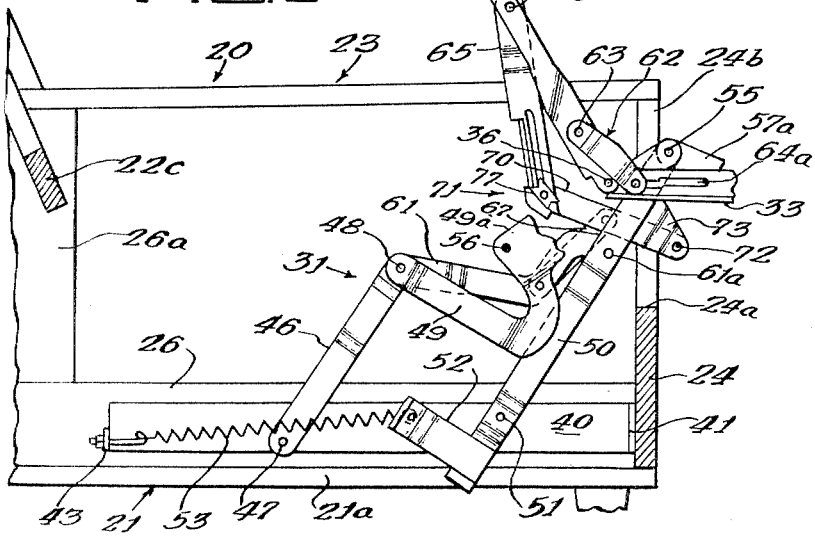
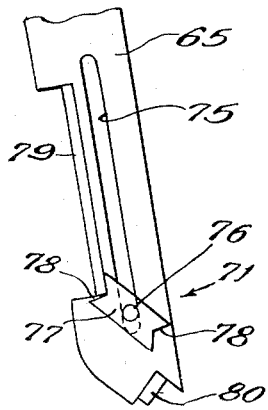

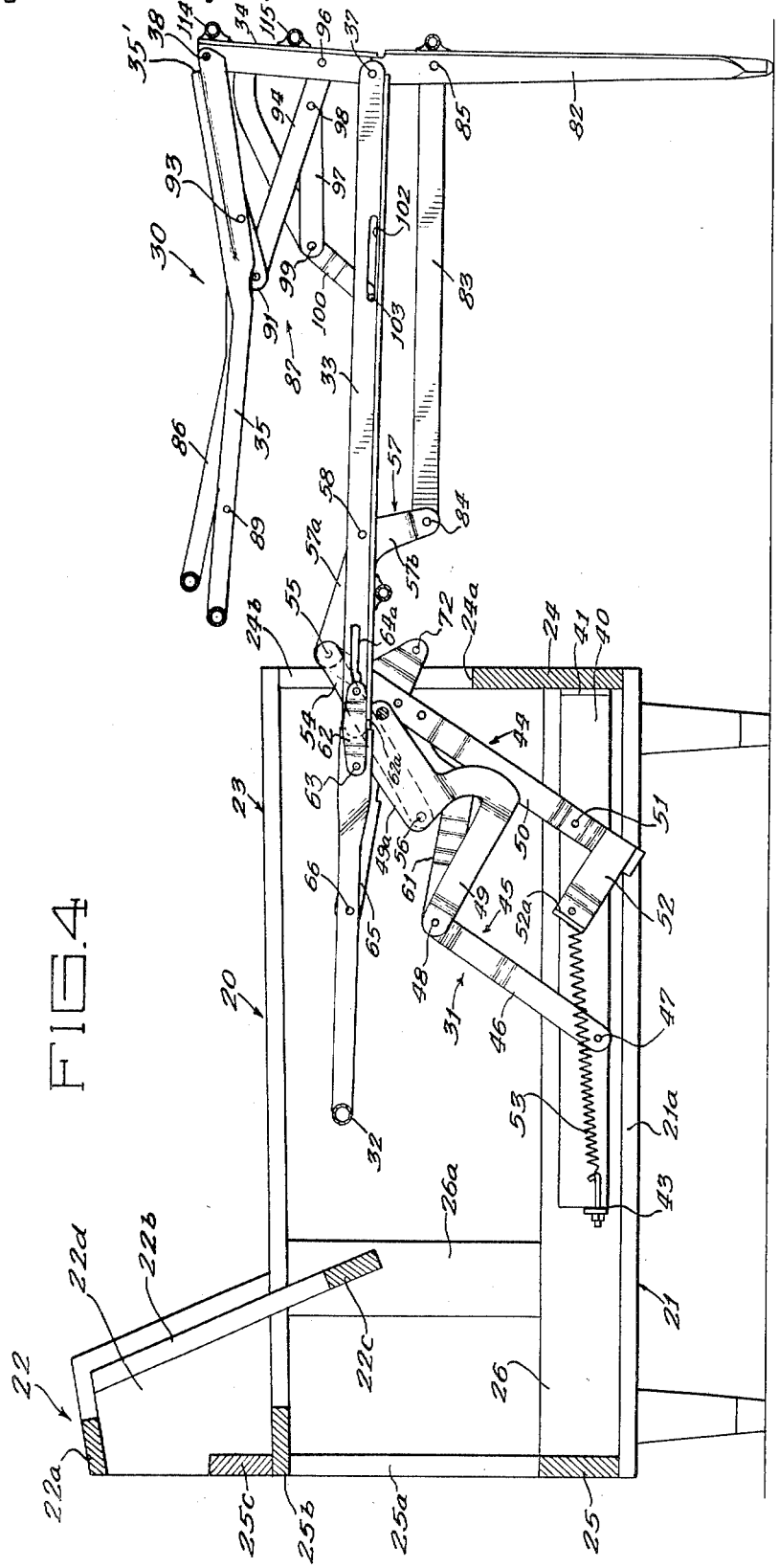

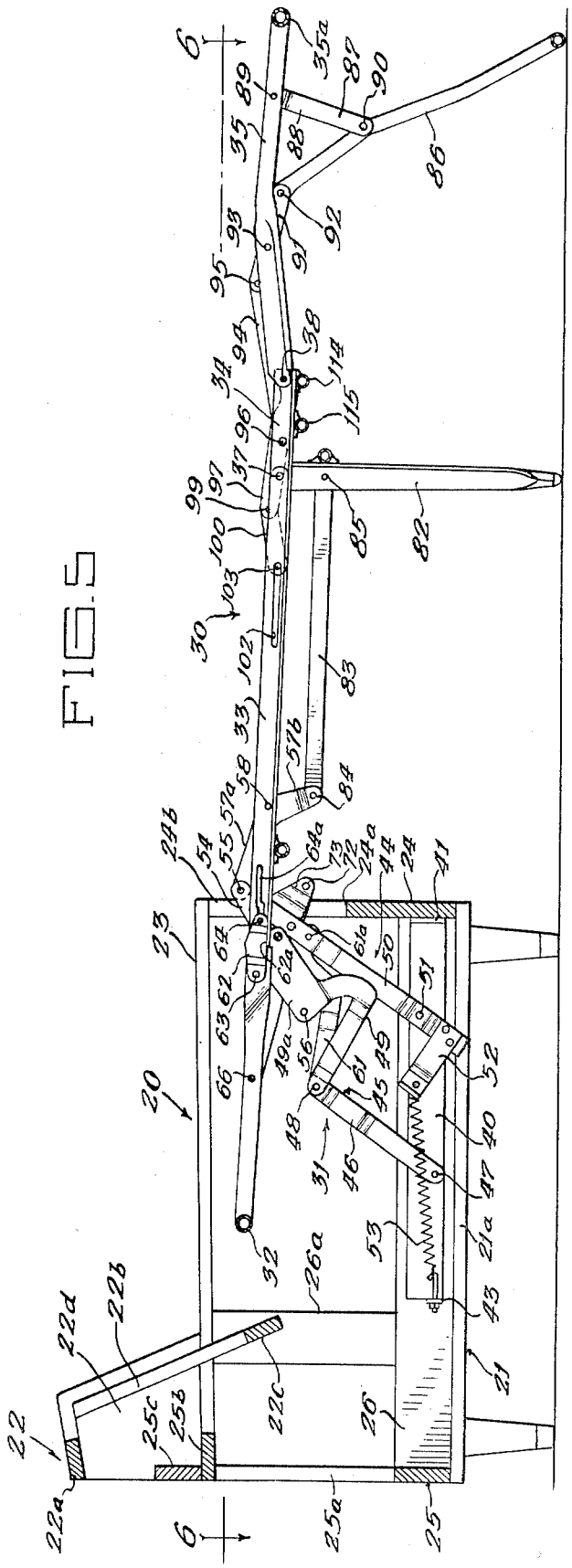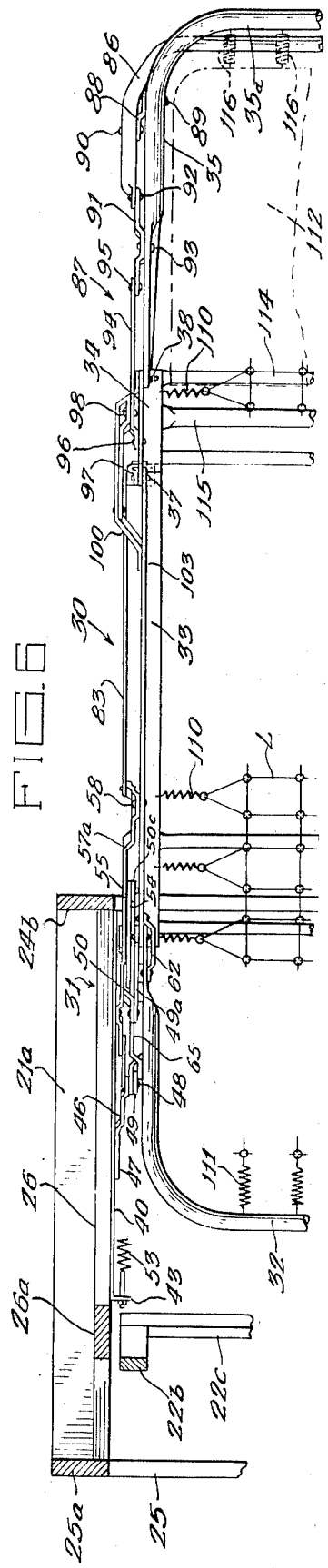

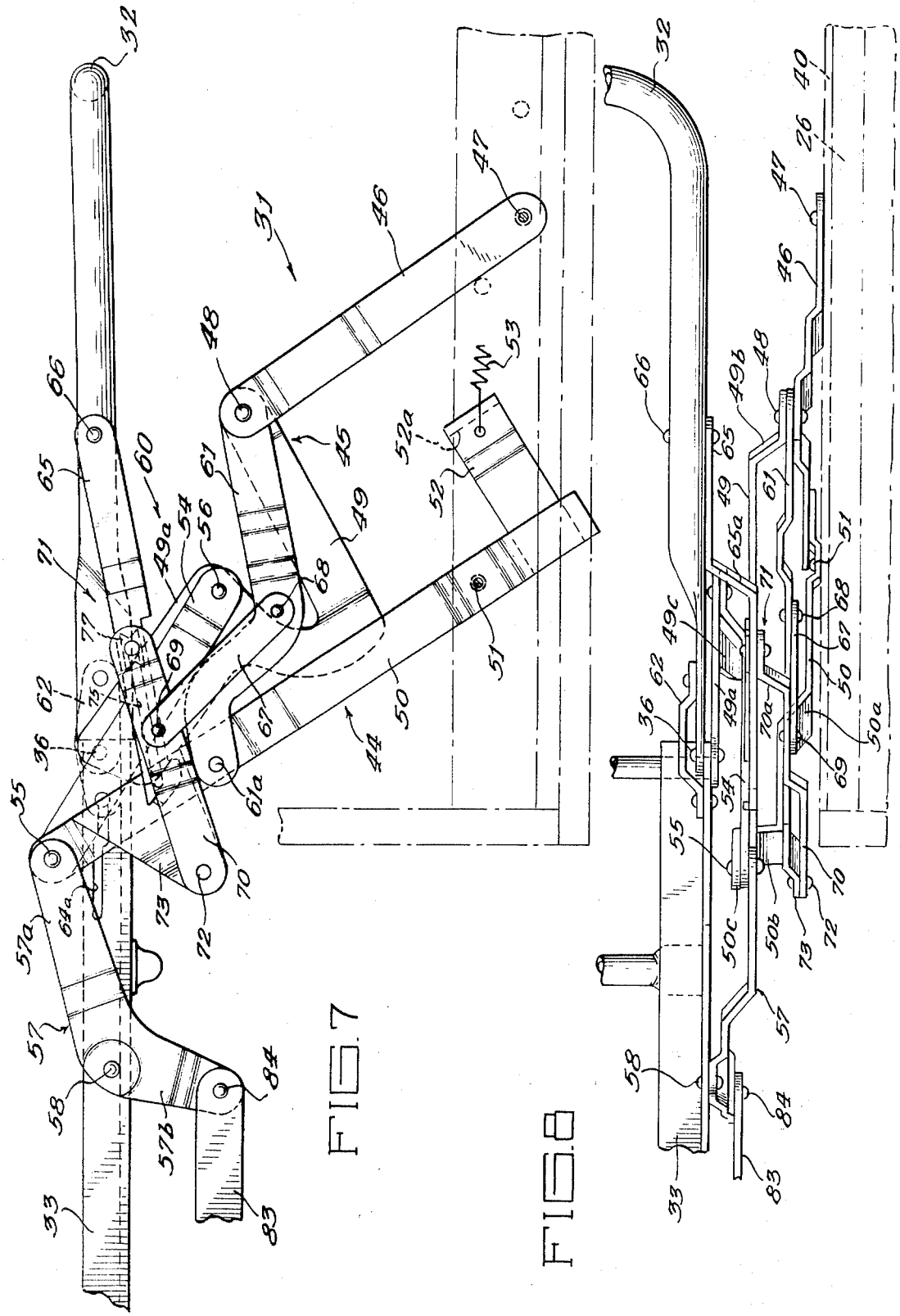

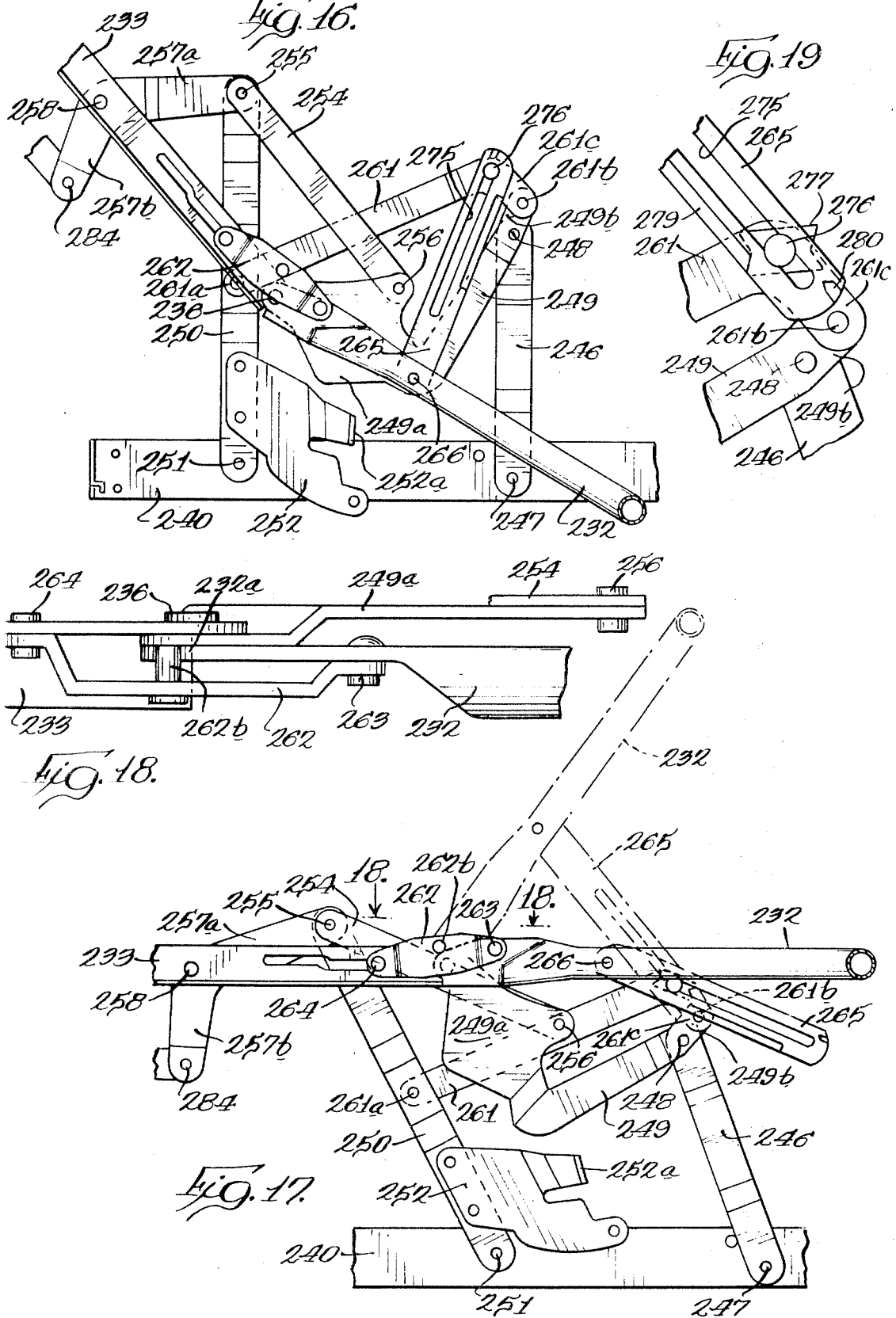

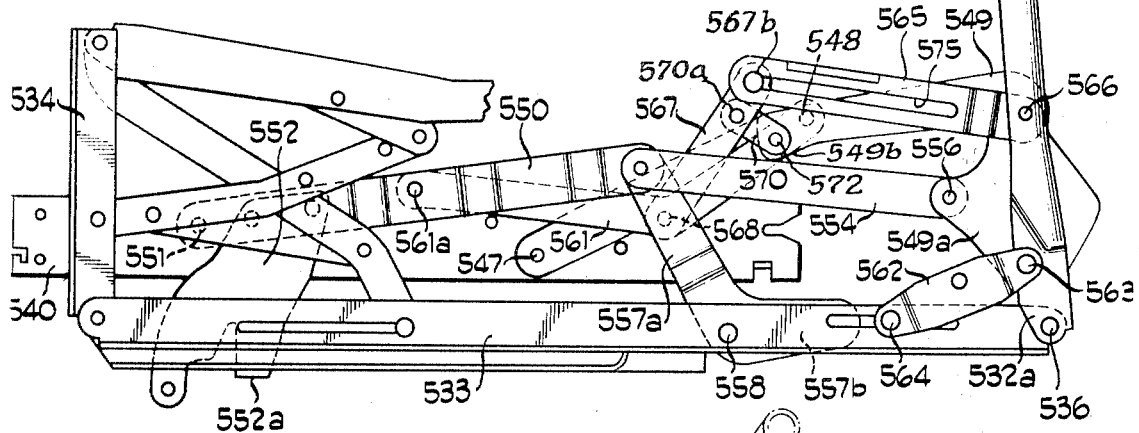
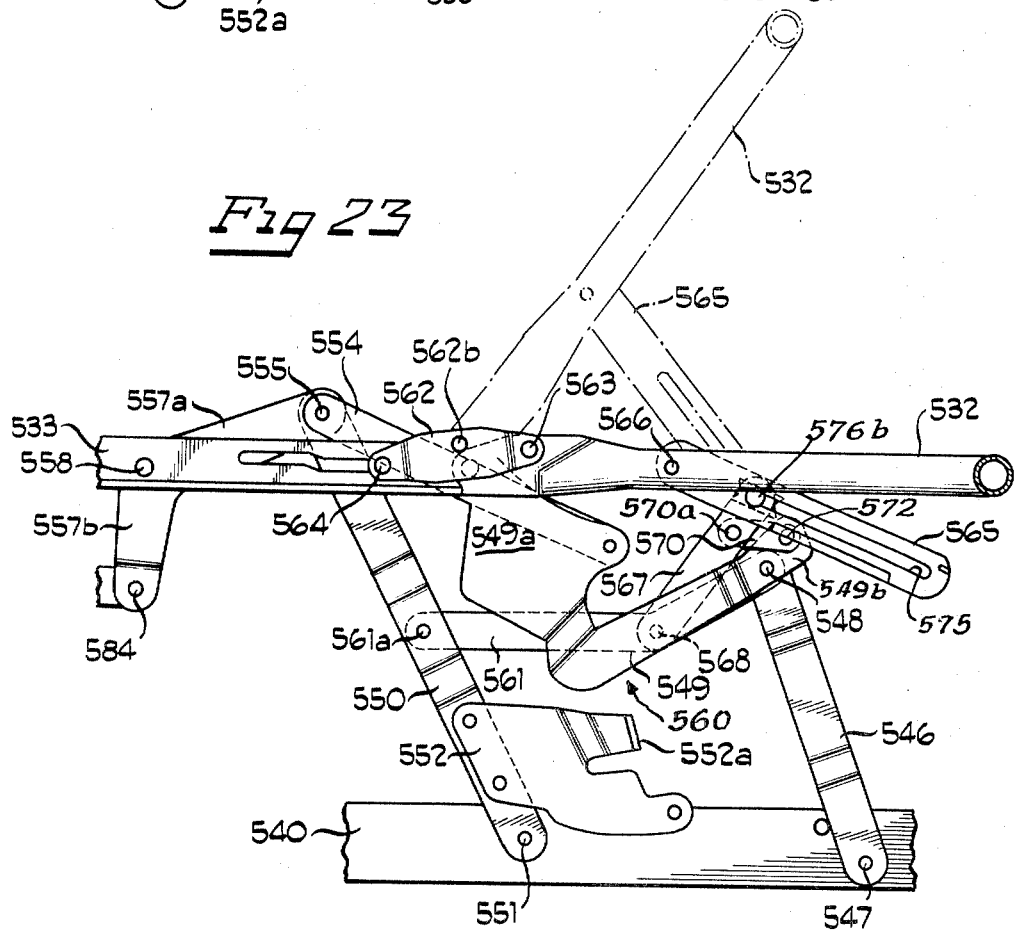

June 23, 1970

A. J. MIKOS 3,516,096

SOFA BED

Original Filed July 26, 1968

3,516,096
SOFA BED
Aloysius J. Mikos, Skokie, Ill., assignor to The Seng Company, a corporation of Delaware
Continuation of application Ser. No. 748,121, July 26, 1968, which is a continuation-in-part of application Ser. No. 667,145, Sept. 12, 1967, which in turn is a continuation-in-part of application Ser. No. 555,599, June 16, 1966. This application June 2, 1969, Ser. No. 834,201
Int. Cl. A47c *17/22, 17/14*
U.S. Cl. 5—13                                    37 Claims

ABSTRACT OF THE DISCLOSURE

A four section foldable sofa bed of the type wherein the inner, intermediate and outer bed sections are disposed substantially entirely below the plane of the top surface of a relatively high fixed front rail of a sofa frame in the retracted position of the bed sections, with the head or rear bed section being supported from the inner bed section rather than from the sofa frame.

A primary linkage system for moving the inner bed section between its retracted position and its extended position comprises rear support link means and front support link means combined with two actuating links which interconnect the rear and front support link means, and one of the two actuating links (herein a "control link") moves in a substantially translatory fashion as the inner bed section moves between said positions. A secondary, or connecting linkage system pivots the rear bed section on the inner bed section between an upright stored position and a normally horizontal extended position, and the connecting linkage system includes a guiding link which is directly operatively connected to the rear bed section and which is operatively connected to the control link a substantial distance behind the front support link means.

CROSS REFERENCE TO RELATED APPLICATIONS

The present application is a continuation of my copending application 748,121, now abandoned, filed July 26, 1968, which was a continuation-in-part of my application Ser. No. 667,145, filed Sept. 12, 1967, now abandoned, which was in turn a continuation-in-part of my application Ser. No. 555,599, filed June 16, 1966, now abandoned.

BACKGROUND OF THE INVENTION

This invention relates in general to convertible furniture, such as a sofa sleeper; and more particularly this invention relates to a new and improved linkage system for swinging the rear bed section on the inner bed section during movement of the bed structure between its retracted and intermediate positions.

Heretofore, it has been well known to provide a sofa sleeper with pivotally interconnected head or rear, inner, intermediate and outer bed sections. In such known sofa bed constructions, the bed sections are usually movable between: (1) a fully folded position wherein the rear bed section is positioned generally upright at the rear of the sofa frame, the inner bed section is positioned at the lower portion of the sofa frame with the outer bed section folded over the inner bed section generally parallel therewith and the intermediate bed section generally upright at the front of the sofa frame; (2) an intermediate position wherein the rear bed section and the inner bed section are in a coplanar horizontal disposition projecting over the sofa front rail, with the outer bed section still folded over parallel with the inner bed section and the intermediate bed section still generally upright at the front; and (3) a fully extended position wherein all of the bed sections are coplanar and horizontally disposed. Locking means are conventionally provided for preventing movement of the outer bed section relative to the inner bed section in the fully folded position, so as to positively compress the mattress carried by the bed sections between the inner and outer sections.

One of the more recent developments in the sofa bed field is the so-called "over-the-rail" sofa bed design in which a unitary, relatively high front rail extends across the front of the sofa bed frame so as to eliminate the earlier "split" front rail which always identified a sofa sleeper as a convertible piece. This construction has presented difficult mechanical problems in providing a linkage for moving the sofa bed sections between the fully folded position and the intermediate position principally because the back frame of the sofa extends forwardly and downwardly and has a bottom rail disposed just above the plane of the top surface of the front rail, and the rear bed section is behind the bottom rail in the fully folded position. Thus, the lower surface of the back rest bottom rail and the upper surface of the front rail define an extremely restricted space within which the bed frame must be manipulated in moving into and out of the fully folded position.

My Pat. 3,284,814 discloses an over-the-rail sofa sleeper in which the rear bed section is directly suspended from the rear portion of the sofa frame on hook-shaped arms similar to those used in prior art four section sofa sleepers of the split-rail type. Such arms are undesirable because they limit the styling choices in the finishing of the sofa back.

Rogers Pat. 3,284,811 discloses an improvement on the structure of my Pat. 3,284,814 in that it eliminates any direct connection between the sofa frame and the rear bed section, so that said rear section is pivoted on the inner section and suspended from the latter in a cantilever fashion when the bed structure is in its intermediate and fully extended positions. The inner bed section of the Rogers structure is mounted on a primary linkage system that includes rear support link means, front support link means, and two actuating links which interconnect the rear and front support link means. A guiding link for pivoting the rear bed section on the inner bed section during movement between retracted and intermediate positions, and for supporting the rear section in intermediate position, is directly pivotally connected to a link of the front support link means, and makes a pin-and-slot connection with the rear bed section. This arrangement has the disadvantage, not present in the structure of my '814 patent, of folding the rear bed section to a retracted position which is at an angle of substantially less than 90° with respect to the inner bed section, and this causes the mattress position when the bed frame is in the fully extended position, so that a person may recline comfortably on the bed with his upper torso in an elevated position to read or watch television. By having the head bed section suported entirely independently of the sofa frame, the problem of clearance with the back rest, heretofore present with sofa beds having control links of the type described above, is minimized.

Another novel feature of the present invention is the substantially perpendicular positioning of the head or rear bed section relative to the inner bed section in the fully folded position. In contrast to this, in those few prior art devices which had a head bed section supported independently of the sofa frame, the angle between the head bed section and the inner bed section was less than 85°, and usually in the neighborhood of 80°–83°. Because of this angular relationship present in prior art devices, it was necessary to compress the mattress carried by the bed sections against the back of the back rest, when the bed sections were moved into the fully folded position. The interference between the mattress portion on the head bed section and the back rest impeded movement of the bed frame structure into the fully folded position to such an extent that oftentimes a great deal of physical exertion was necessary to completely move the bed frame structure into the fully folded position. The present invention eliminates this interference problem by having the head bed section disposed at substantially right angles with respect to the inner bed section, and this arrangement also enables the head bed section to be slightly longer than heretofore thought possible.

SUMMARY

The sofa bed of the present invention, in solving the problems set forth above, provides novel linkage supporting means whereby the head bed section is supported directly upon the inner bed section, and no supporting means are provided for the rear bed section, and this guiding link (or these links) hereinafter called "modifying links," serve to delay the motion of the rear bed section with respect to the motion of the control link as the bed structure is folded into the frame so as to prevent the rear bed section from moving into a folded position which is less than a right angle with respect to the inner bed section.

Other features and objects of the invention will hereinafter become more fully apparent from the following description, taken in connection with the annexed drawings, wherein:

BRIEF DESCRIPTION OF THE DRAWINGS

FIG. 1 is a sectional view taken through a sofa bed adjacent one side thereof, and showing a preferred embodiment of the bed frame of the present invention in the fully folded position;

FIG. 2 is a view similar to FIG. 1, and illustrating the bed frame in a first intermediate position between the fully folded position and the fully extended position;

FIG. 3 is a view similar to FIGS. 1 and 2, and illustrating the bed frame structure in a further intermediate position;

FIG. 4 is a view similar to FIGS. 1-3, and showing the bed frame structure in a partially extended position wherein the outer bed section is folded over the inner bed section in substantial parallelism therewith:

FIG. 5 is a view similar to FIGS. 1-4, on a slightly reduced scale, and illustrating the bed frame structure in the fully extended position;

FIG. 6 is a fragmentary plan view of the bed frame structure taken generally along line 6—6 of FIG. 5;

FIG. 7 is an enlarged fragmentary view of the bed frame structure supporting linkage in the fully extended position and viewed from the outside of the sofa frame;

FIG. 8 is a plan view of the structure illustrated in FIG. 7;

FIG. 9 is a fragmentary view of the rear portion of the bed frame structure in fully extended position, and illustrating the head bed section in a raised position for comfortable TV viewing or reading;

FIG. 10 is an enlarged fragmentary detail view of the head section supporting link;

FIG. 11 is a fragmentary side elevational view of the junction between the head and inner bed sections, and illustrating a modification of the invention;

FIG. 12 is an enlarged fragmentary side elevational view of the forward end of one of the side channels of the inner bed section;

FIG. 16 is a side elevational view of the fixture illustrated in FIGS. 14 and 15 in a partially unfolded position;

FIG. 17 is a side elevational view of the fixture of FIGS. 14–16 in the fully extended or bed position;

FIG. 18 is an enlarged view taken generally along line 18—18 of FIG. 17;

FIG. 19 is an enlarged detail view illustrating the structure for movably supporting the head bed section;

FIGS. 22 and 24 are side elevational views, similar to FIG. 15, illustrating still further modifications of the sofa bed fixture in the fully folded or sofa position; and FIGS. 23 and 25 are side elevational views, similar to FIG. 17, illustrating the embodiments of FIGS. 22 and 24, respectively, in the fully extended or bed position.

DESCRIPTION OF PREFERRED EMBODIMENTS

Figure 13:
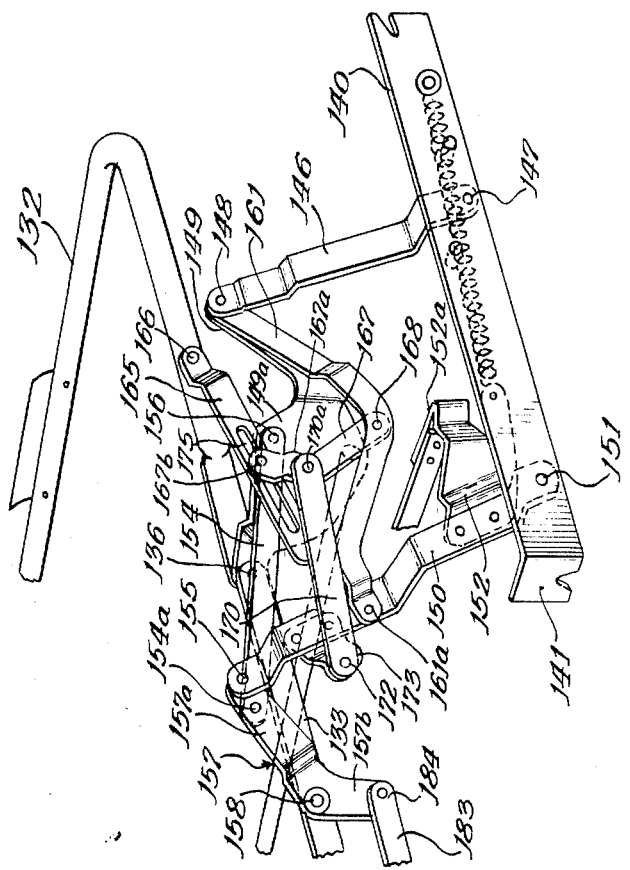
FIG. 13 is a fragmentary side perspective view of a modification of the sofa bed fixture.
Figure 14:
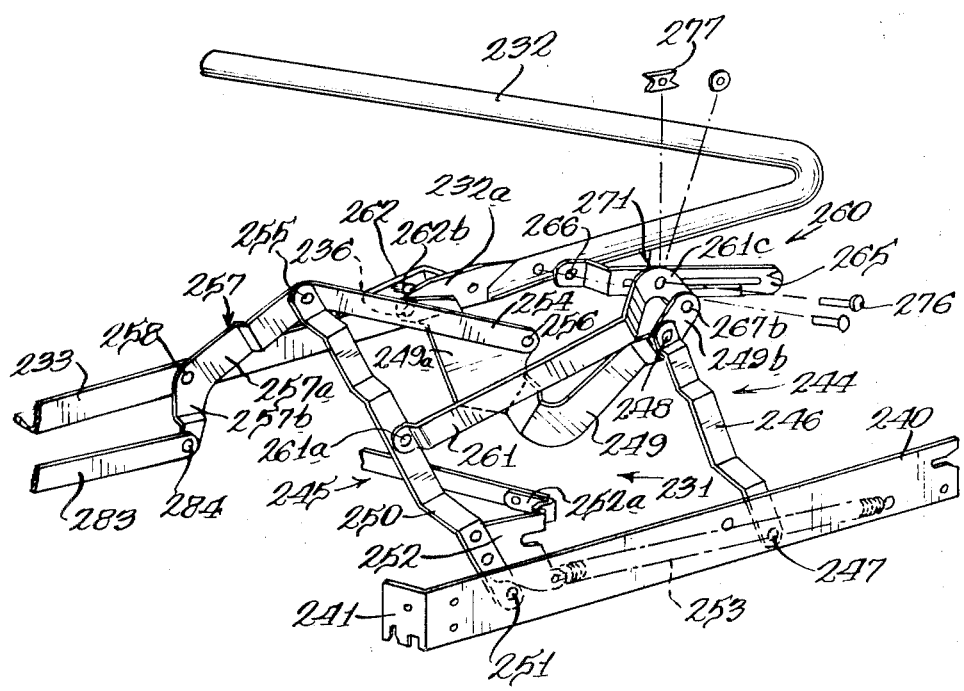
FIG. 14 is a fragmentary side perspective view of a further modified form of the sofa bed fixture.

While this invention is susceptible of embodiment in many different forms, there is shown in the drawings and will herein be described in detail preferred embodiments of the invention and modifications thereof with the understanding that the present disclosure is to be considered as an exemplification of the principles of the invention and is not intended to limit the invention to the embodiments illustrated. The scope of the invention will be pointed out in the appended claims.

Referring to the drawings in greater detail, and especially to FIGS. 1–5, the sofa bed of the present invention is provided with a wooden frame, indicated generally at 20. The frame includes a base indicated generally at 21, a back structure indicated generally at 22, and arm structure indicated generally at 23. The base includes a fixed front rail 24 having a planar top surface 24a, vertical uprights 24b extending upwardly from opposite sides of the front rail 24, a fixed back panel 25, vertical uprights 25a extending upwardly from opposite sides of the back panel 25, a horizontally disposed brace member 25b extending between the upper ends of uprights 25a, a vertically extending support member 25c extending upwardly at the rear of member 25b, fixed end rails 26 extending between front rail 24 and rear panel 25, and side support members 26a extending upwardly from members 26 intermediate the ends thereof. The back structure 22 includes a slightly inclined top member 22a that is secured to laterally spaced support members 22d; and downwardly and forwardly inclined front frame bars 22b are secured to members 22d, with a front lower cross member or breast rail 22c extending between the lower ends of members 22b. The lower end of member 22c terminates in a plane which is spaced above the plane of the top surface 24a of front rail 24 by a distance which is only a small fraction of the height of the front rail. This relationship defines a very restricted enclosure within which the bed structure to be hereafter described is moved between a fully folded position within the base of the frame, and a fully extended position with certain portions of the bed structure disposed above the plane of the upper surface of the front rail. Frame members 22b and 22c are inclined at an angle which affords a comfortable back position, and upholstering (not shown) is secured to frame members 22b and 22c. The arm structures 23 are also upholstered in the finished sofa unit.

Since the mechanism for both sides of the folding bed structure is identical, only the complete mechanism at one side of the structure is illustrated in the drawings, and it is to be understood that the side of the bed structure not shown in the drawings has an identical set of elements with those illustrated in the drawings and here described.

The folding bed structure is indicated generally at 30, and is mounted on the sofa bed frame 20 by a supporting linkage means indicated generally at 31. Bed structure 30 includes a U-shaped head or read bed section 32, an inner bed section 33, an intermediate bed section 34, and a U-shaped outer bed section 35 which includes a foot rail 35a; said sections being foldably connected in end to end relationship with respect to one another by means of respective pivots 36, 37 and 38. A supporting bracket 40 is secured to each side rail 26, and includes a transversely extending forward flange 41 secured to front rail 24, and a transversely extending rearward flange 43 adapted to receive one end of a spring to be hereafter described. The supporting linkage means 31 includes front link support means 44 and rear support link means 45 connected between the bracket 40 and the folding bed structure 30 for lifting the folding bed structure from the fully folded position of FIG. 1 and swinging the same through the intermediate positions of FIGS. 2 and 3 to the partially extended position of FIG. 4.

The rear support link means 45 includes a first rear support link 46 connected at one end to a pivot 47 at the rear portion of bracket 40, and connected by a pivot 48 at its opposite end to a second rear support link 49. Link 49 is a generally L-shaped member, with the end 49a remote from pivot 48 being enlarged and somewhat rectangularly shaped, and having one corner connected to the pivot junction 36 between head bed section 32 and inner bed section 33. As can be best seen in FIG. 8, portion 49a of link 49 is off-set inwardly from the remainder of the link to span the distance between bracket 40 and bed frame 30, and to provide clearance for additional links to be hereinafter described, and this offset is created by intermediate bent link portions 49b and 49c.

The front support link means 44 includes a first front support link 50 connected to bracket 40 at a pivot 51 spaced forwardly of, and slightly above, pivot 47, and a second front support link in the form of a bell crank 57. A bracket 52 is secured to link 50 below pivot 51 at substantially right angles with respect thereto, and a biasing spring 53 is connected between bracket 52 and flange 43 on mounting bracket 40. Spring 53 serves to ease the lifting of the folding bed structure 30 from the fully folded position, as will hereinafter appear. A flange 52a extends generally perpendicularly to bracket 52, and is adapted to provide support for the foldable bed frame 30 in the fully folded position, as can be best seen in FIG. 1.

Actuating link means includes a first actuating link 54 which is connected at one of its ends by a pivot 55 to the end of the first front support link 50 remote from bracket 40, and a second actuating link, or control link, 61. As can be best seen in FIG. 8, link 50 includes a first inwardly inclined portion 50a, and a second inwardly inclined portion 50b, to define an inwardly off-set portion 50c connected to first actuating link 54 at pivot 55. The end of first actuating link 54 remote from pivot 55 is connected by a pivot 56 to an intermediate point of the second rear support link 49, and more particularly along the same side of the generally rectangularly shaped enlarged portion 49a as pivot 36, but adjacent the other corner of portion 49a.

The second front support link—i.e., bell crank 57—is connected to inner bed section 33 at pivot 58 and including arms 57a and 57b on opposite sides of pivot 58. Arm 57a is connected at pivot 55 to the first front support link 50 and first actuating link 54, while arm 57b is connected to leg actuating means to be hereinafter described.

The head or rear frame section 32 is a generally U-shaped member (FIG. 6), and is not directly connected to the sofa bed frame 20, but instead (see FIGS. 7 and 8) is mounted on the supporting linkage means 31 by connecting link means, indicated generally at 60, which includes the control link 61, a first guiding link 65, and second and third guiding links 67 and 70.

The control link 61 is pivotally connected at one end to the pivot 48 that connects the first and second rear support links 46 and 49, and at the other end to a pivot 61a which is intermediate the ends of the first front support link 50. Comparison of FIGS. 1 to 4 shows that the control link 61 moves in a substantially translatory fashion from the folded position of FIG. 1, through the positions of FIGS. 2 and 3 to the extended position of FIG. 4. The first guiding link 65 is directly pivotally connected at 66 to the rear bed frame section 32, and an outwardly off-set portion 65a of said first guiding link 65 makes a lost motion connection 71 with an inwardly off-set portion 70a of the third guiding link 70. The second guiding link, or modifying link 67 is connected by a pivot 68 to an intermediate point on the control link 61, and has its opposite end pivotally connected at 69 to an intermediate point of the third guiding link 70 which also acts as a modifying link and has one end pivotally connected at 72 to an integral bracket 73 on the first front support link 50. The second and third guiding links 67 and 70 serve as modifying links so that the motion of the first guiding link 65 is not derived directly from the control link.

The lost motion connection 71 is best seen in FIG. 10 to include a longitudinal slot 75 in first guiding link 65, and on the modifying link 70 is a stud 76 which is slidably received in said slot and carries a pivotally mounted latching cam 77 in face-abutting relationship to the inner side of link 65.

Cam 77 is provided with V-shaped notches 78 at opposite ends which are adapted to engage a locking flange 79 on link 65, to lock the head bed section 32 in the elevated position illustrated in FIG. 9. An abutment 80 is provided at the lower portion of guiding link 65, for pivoting the locking cam 77 upon upward movement of the head bed section past the position of FIG. 9, to initially move one notch 78 into a position to be engaged by the end of flange 79, and also to pivot the cam 77 to an unlatched position to free the rear bed section 32 so that it can be lowered.

A generally triangularly shaped link 62 is pivoted at one corner 63 to the rear bed section 32, and an opposite corner of link 62 includes a pin 64 which makes a sliding connection with a slot 64a in the inner bed section 33. Inner bed section 33 is formed of angle members, and the base 62a of link 62 rests on the horizontal flange 33a of the bed section angle member to dispose pivot 63 and pin 64 in a horizontal plane and locate the head bed section in a horizontal plane in the fully extended position of the folding bed frame.

In certain instances it is desirable to have the head bed section 32 permanently elevated a very slight amount in the fully extended position of the folding bed frame. This can be easily accomplished by the structure of the present invention by merely reversing link 62 to place side 62b in engagement with flange 33a, as is shown in FIG. 11, in which case pivot 63 is elevated slightly with respect to pivot 64 to incline rear bed section 32 slightly with respect to the plane of the remaining bed sections.

As is clear from FIG. 12, slot 64a includes a forward portion 64b, and a rearward portion 64c which is upwardly offset from, but parallel with, portion 64b. An inclined cam surface 64d connects the upper surfaces of slot portions 64b and 64c, while a curved detent surface 64e connects the lower surfaces of slot portions 64b and 64c. When the folding bed frame is in the fully folded position of FIG. 1, pin 64 bears against detent surface 64e to positively prevent the rear bed section 32 from pivoting and moving toward the inner bed section 33. This feature is of special significance when a mattress is not contained within the folding bed frame, as is true during shipment or installation, because such movement of rear bed section 32 may cause accidental rotation of cam 77, and subsequent malfunctioning of the bed frame during use. When the folding bed frame is shipped, pivot 66 is disconnected from rear bed section 32, and said rear bed section is folded downwardly onto the other bed sections to form a compact package. During the latter movement, pin 64 slides down slot portion 64c to the end thereof. When the bed is assembled, and the rear bed section 32 is moved into the position shown in FIG. 9, pin 64 rides along slot portion 64c until it engages cam surface 64d which cams the pin 64 downwardly in slot portion 64b.

A first supporting leg 82 is pivotally connected to the folding bed frame 30 at the junction 37 between the inner bed section 33 and the intermediate bed section 34. A leg actuating link 83 has one end connected to the lower end of bell crank arm 57b by pivot 84 and its opposite end connected to leg 82 by a pivot 85 at a point spaced from pivot 37. A second or outer support leg 86, in the form of a U-shaped member, is secured to the outer bed section 35 by linkage means 87 which also serves to provide means for locking the outer bed section 35 in parallelism with inner bed section 33 and against movement relative thereto.

Linkage means 87 includes a first link 88 connected at one end by a pivot 89 to outer bed section 35, and the opposite end of link 88 is connected by a pivot 90 to leg 86. Linkage means 87 includes a second link 91 connected at one end by pivot 92 to the upper end of leg 86, and connected intermediate its ends by a pivot 93 to outer bed section 35. The opposite end of link 91 is connected to one end of a third link 94 of linkage means 87 by a pivot 95, and the opposite end of link 94 is connected to the intermediate bed section 34 by a pivot 96. Linkage means 87 further includes a fourth link 97 connected at one end by a pivot 98 to link 94 intermediate the end thereof and adjacent to pivot 96. The opposite end of link 97 is connected by a pivot 99 to a fifth link 100 of linkage means 87, and link 100 has one end pivotally connected to the junction between intermediate bed section 34 and outer bed section 35 and the opposite end is connected by a lost motion connection means 101 to the inner bed section 33. The lost motion connection means 101 includes an elongate slot 102 in inner bed section 35, which slidably receives a pin 103 carried by one end of link 100. The pivotal connection 99 of link 97 to link 100 is adjacent to, but spaced from, pin 103. The outer bed section 35 may be locked in parallelism with inner bed section 33 by pivoting leg 86 to move pivot 90 to a position in alignment with, or past, a line between pivots 89 and 92. In this position, an upward lifting force on outer bed section 35 tends to pivot link 91 in a counterclockwise direction (FIG. 4), and this force cannot pivot leg 86 because of the location of pivot 90. If leg 86 is lifted to move pivot 90 past the line between pivots 89 and 92, the counterclockwise pivoting of link 91 caused by the lifting of outer bed section 35 will pivot link 89 in a counterclockwise direction, to begin unfolding of the leg 86 and allowing the inner bed section 35 to be pivoted relative to the inner bed section 33.

In the fully folded position of FIG. 1, the folding bed frame structure 30 is disposed substantially completely beneath the plane of the top surface 24a of the front rail 24. The inner bed section 33 is disposed generally horizontally below the mounting bracket 40, with the intermediate bed section 34 positioned generally vertically slightly behind the front rail 24, and the outer bed section 35 disposed in substantial parallelism with the inner bed section 33 and slightly above the mounting bracket 40. The rear bed section 32 is positioned at an angle slightly greater than 90° with respect to the inner bed section 33, so as to dispose the same substantially vertically behind the back rest members 22b and 22c. As is clear from FIG. 1, the rear frame section 32 extends slightly away from the back rest structure, so as to provide substantial clearance between the mattress portion (not shown) carried by the head bed section and the rear of the breast rail 22c. In the fully folded position the first rear support link 46 is inclined upwardly at a small angle, while the first front support link 50 is positioned generally horizontally.

In moving from the fully folded position toward the fully extended position of FIG. 5, the folding bed frame structure is initially lifted to a first intermediate position illustrated in FIG. 2. In this position, the bed sections 32, 33, 34 and 35 remain in substantially the same relationship with respect to one another as illustrated in FIG. 1, and the pivot 37 joining the inner bed section 33 and the intermediate section 34 travels in a substantially vertical path to a position well above the plane of the upper surface 24a of the front rail 24. As the bed frame sections move into the position of FIG. 2, the first rear support link 46 pivots only slightly in a clockwise direction while first front support link 50 moves from the nearly horizontal position of FIG. 1 toward a position of parallelism with first rear support link 46. The clockwise pivotal movement of first front support link 50, and the cooperative action of second and third front support links 54 and 57, respectively, swings the front of the folding bed frame structure 20 upwardly, while the second rear support link 49 is pivoted in a counterclockwise direction about pivot 48 through the action of the first actuating link 54 and the control link 61 acting on pivot 48 of rear support links 46 and 49 to swing the rear of the folding bed frame downwardly and forwardly. After the pivot 36 (connecting the second rear support link 49 to the folding bed frame) moves past a vertical line through pivot 48, the actuating link 54 and the control link 61 cooperate to cause the second rear support link 49 to pivot upwardly and lift the folding bed frame structure, and the clockwise pivoting movement of first rear support link 46 translates the folding bed frame structure forwardly toward the position of FIG. 3.

The arm 57a of bell crank 57, actuating link 54, portion 49a of second rear support link 49, and the portion of inner bed section 33 between pivots 36 and 58 cooperate to define a four bar linkage means which remains substantially stationary in moving from the position of FIG. 1 to the position of FIG. 2. As the second rear support link 49 pivots about pivot 48 from the position of FIG. 2 toward the position of FIG. 3, the afore-described four bar linkage means begins to collapse rearwardly due to the fact that pivot 36 swings about a larger arc than pivot 56 to advance the inner bed section 33 forwardly and upwardly at a faster rate than second front support link 54. Thus, bell crank 57 begins to pivot counterclockwise with respect to inner bed section 33, and the four bar linkage means begins to flatten.

As the folding bed frame structure moves from the position of FIG. 1 to the position of FIG. 2, pin 76 on modifying link 70 is disposed substantially at the right hand end of slot 75 to retain the head bed section 32 generally perpendicular to the inner bed section 33. The clockwise pivoting movement of first front support link 50 causes control link 61 to pivot in a counterclockwise direction about pivot 48 to guide first front support link 50 into a position substantially parallel with first rear support link 46 in FIG. 3, and the modifying link 70 is pivoted downwardly by the cooperative action of control link 61, modifying link 67 and guiding link 65, so that the rear bed section 32 begins to pivot rearwardly in a counterclockwise direction relative to inner bed section 33 as the folding bed structure moves from the position of FIG. 2 to the position of FIG. 3. Since pivot 72 swings on a larger arc than pivot 61a in moving from the position of FIG. 2 to the position of FIG. 3, and then on to the position of FIG. 4, modifying link 70 is translated forwardly relative to control link 61, and modifying link 67 pivots forwardly about pivot 68 past a vertical line through pivots 68 and 69. As modifying link 67 folds forwardly on control link 61, guiding link 65 pivots clockwise relative to rear bed section 32, and as the movement is continued said rear bed section moves into a position in horizontal alignment with the inner bed section 33, while guiding link 65 pivots to a position disposed below the horizontal plane of the bed sections 32 and 33 in substantial alignment with link 70 and pin 76 slides down the slot 75 to a position adjacent the rear end thereof.

As the bell crank 57 begins to pivot in a counterclockwise direction as described above, the supporting leg 82 is swung outwardly by the connecting link 83, as can be seen in FIGS. 3 and 4. As the first front support link 50 moves past a vertical line through pivot 51, the bed frame sections are swung forwardly and downwardly into the partially extended position of FIG. 4, where the supporting leg 82 engages the floor. The bed frame may be moved from the partially extended position of FIG. 4 to the fully extended position of FIG. 5 by first lifting the leg 86 to move the pivot point 90 over center to release the locking means, and then pivoting the outer bed section 35 and the intermediate bed section 34 about pivot 37 until the outer leg 86 engages the floor to dispose of bed sections 34 and 35 in horizontal alignment with the bed sections 32 and 33. During the beginning of this movement, link 91 moves in a counterclockwise direction, as viewed in FIGS. 4 and 5, and link 88 moves in a counterclockwise direction to pivot leg 86 relative to outer bed section 35. As the movement continues, link 94 pivots in a clockwise direction about pivot 96, and link 97 draws link 100 forwardly to move pin 103 along slot 102.

In the fully extended position link 88 is positioned at a slight angle with respect to a vertical link through pivot 89, and acts as a brace for outer bed section 35. Link 91 is slightly rearwardly and upwardly inclined, and link 94 is slightly forwardly and upwardly inclined to position pivot 95 above a line through pivots 93 and 96. This arrangement provides means for preventing buckling of the bed frame when a force is applied to the forwardmost portion of the outer bed section 35, as by someone sitting on it. More particularly, if a force is applied to the forwardmost portion of the outer bed section 35, section 35 tends to pivot downwardly about pivot 38, which in turn transmits a downward force to link 94 through link 91 and pivot 95. Thus, a four bar linkage means is defined by the span of section 35 between pivots 38 and 93, the portion of link 91 between pivots 93 and 95, link 94, and the span of intermediate bed section 34 between pivots 96 and 38. Since the distance between pivots 95 and 96 is greater than the distance between pivots 38 and 93, link 91 will pivot in a counterclockwise direction when a force is applied to the outermost portion of section 35. Thus, pivot 95 will tend to move downwardly, and a force will be applied through link 94 downwardly to bed section 34 to prevent the same from buckling.

Rear bed section 32 is provided at its forwardmost end with a notch 32' which engages an abutment 33', formed by the rearmost portion of the inner bed section 33, to locate the rear and inner bed sections in a horizontal plane in the fully extended position. In a like manner, the rearmost end of outer bed section 35 is provided with a notch 35' which engages an abutment 34', formed by the forwardmost portion of intermediate bed section 34, to locate the outer and intermediate bed sections in the horizontal plane of the head and inner bed sections in the fully extended position.

When the bed frame structure is in the fully extended position, the rear bed section 32 may be elevated and latched in the position shown in FIG. 9. As the rear bed section 32 is elevated, guiding link 65 pivots in a clockwise direction and the pin 76 on modifying link 70 slides along slot 75. A side of locking cam 77 rides along the flange 79 on link 65, and as the rear bed section 32 reaches its position of maximum elevation, one notch 78 of cam 77 engages the abutment 80 to pivot the locking cam 77 in a counterclockwise direction. The rear bed section is then lowered slightly, and the other notch 78 on the locking cam 77 engages the end of flange 79 on guiding link 65 to securely latch the rear bed section 32 in the elevated position of FIG. 9. When it is desired to return the rear bed section 32 to a position in horizontal alignment with the remaining bed sections, it is necessary to merely lift said bed sections 32 to free the notch 78 from flange 79, and engage the side of locking cam 77 with the abutment 80 to pivot the locking cam 77 in a counterclockwise direction. When the rear bed section 32 is then lowered, the end of flange 79 engages the opposite side of locking cam 77 to pivot the same further in a counterclockwise direction, and this side of locking cam 77 then rides along the flange 79 as the head bed section 32 is pivoted downwardly.

To return the bed from the fully extended position of FIG. 5 to the fully folded sofa position of FIG. 1, the outer bed section 35 is lifted and folded over the inner bed section 33 into substantial parallelism therewith as shown in FIG. 4. During this movement, link 91 pivots in a clockwise direction because of the fact that the distance between pivots 95 and 96 is greater than the distance between pivots 38 and 93. This causes leg 86 to pivot in a counterclockwise direction about pivot 92 and link 88 to pivot in a counterclockwise direction about pivot 89 to fold the leg 86 onto the outer bed section 35. As section 35 is raised, link 94 acts through link 97 to move pin 103 along slot 102. When the folding bed frame reaches the position of FIG. 4, the leg member 86 is spaced slightly above outer bed section 35 with the pivot point 90 over center to lock the inner and outer leg member 86 is then pressed downwardly to move the pivot point 90 over center to lock the inner and outer bed sections against movement relative to one another. The thus folded bed frame sections are then lifted to the position of FIG. 3, and the above described four bar linkage begins to expand to initiate the folding of leg 82. The bed frame structure 30 is then pushed downwardly and the supporting linkage 31, and more particularly the counterclockwise pivoting of first front support link 50 and the clockwise pivoting of second rear support link 40 about pivot 48, cooperates to swing the bed frame structure rearwardly and downwardly, while guiding link 65 pulls the head bed section 32 into a position substantially perpendicular with the inner bed section 33. As the retracting movement continues, the first front support link 50, acting through the actuating link 54 and control link 61, continues to pivot the second rear support link 49 in a clockwise direction to lift the rear end of the folding bed section into the position of FIG. 1.

Referring now to FIG. 13, a further embodiment of the sofa bed is illustrated wherein certain of the elements are substantially identical with those illustrated in FIGS. 1–12, so that similar reference numerals have been used and have been increased by the sum 100. The embodiment of FIG. 13 differs from the previously described embodiment in two respects. First, the end of a first actuating link 154 is pivoted at a point 154a on a bell crank 157 which is spaced forwardly of and slightly below a pivotal connection 155 between a first front support link 150 and the bell crank 157. Secondly, a modifying link 167 has an off-set upper end 167a which makes a lost motion connection with the guiding link 165 by having a pin 167b ride in an elongate slot 175 in link 165, it being understood that a latching cam is provided on pin 167b for latching the head bed section 132 in an elevated position. In the embodiment of FIG. 13, modifying link 170 makes a pivotal connection 170a with modifying link 167 between pivots 168 and 167b. The linkage means of the embodiment of FIG. 13 functions in a manner which is substantially the same as the linkage means of FIGS. 1–12.

Turning now to FIGS. 14–19, a still further embodiment of the sofa bed fixture is illustrated which is similar to the previously described embodiments, so that reference characters in the 200 series have been utilized to designate elements corresponding to like elements in the embodiments of FIGS. 1–13. In the embodiment of FIGS.

14-19, a rear support link means 244 is connected between a support bracket 240 and the rear portion of an inner bed section 233, with the rear support link means including a first rear support link 246 connected at its lower end at a pivot 247 to a support bracket 240 and connected at its upper end at a pivot 248 to an intermediate portion of a second rear support link 249. Second rear support link 249 includes an enlarged somewhat rectangularly shaped end portion 249a having one corner connected at a pivot 236 to the junction between inner bed section 233 and head bed section 232.

Front support link means 245 is connected between support bracket 240 and inner bed section 233 forwardly of rear support link means 244, and the front support link means 245 includes a first front support link 250 connected at its lower end at a pivot 251 to support bracket 240, and connected at its upper end at a pivot 255 to a first actuating link 254 and a second front support link 257, which is in the form of a bell crank, as in the previous embodiments. An intermediate portion of bell crank 257 is connected to inner bed section 233 at pivot 258, with a first arm 257a of link 257 being connected to the first front support link 250 and the first actuating link 254 at 255, and with a second arm 257b of link 257 being connected to a leg operating link 283 at pivot 284. The actuating link 254 and a control link 261 provide an actuating link means that extends between the rear support link means 244 and the front support link means 245; and to this end, the end of first actuating link 254 remote from pivot 255 is connected to end portion 249a of second rear support link 249 at pivot 256 on the same side of link 249a as pivot 236.

Figure 15:
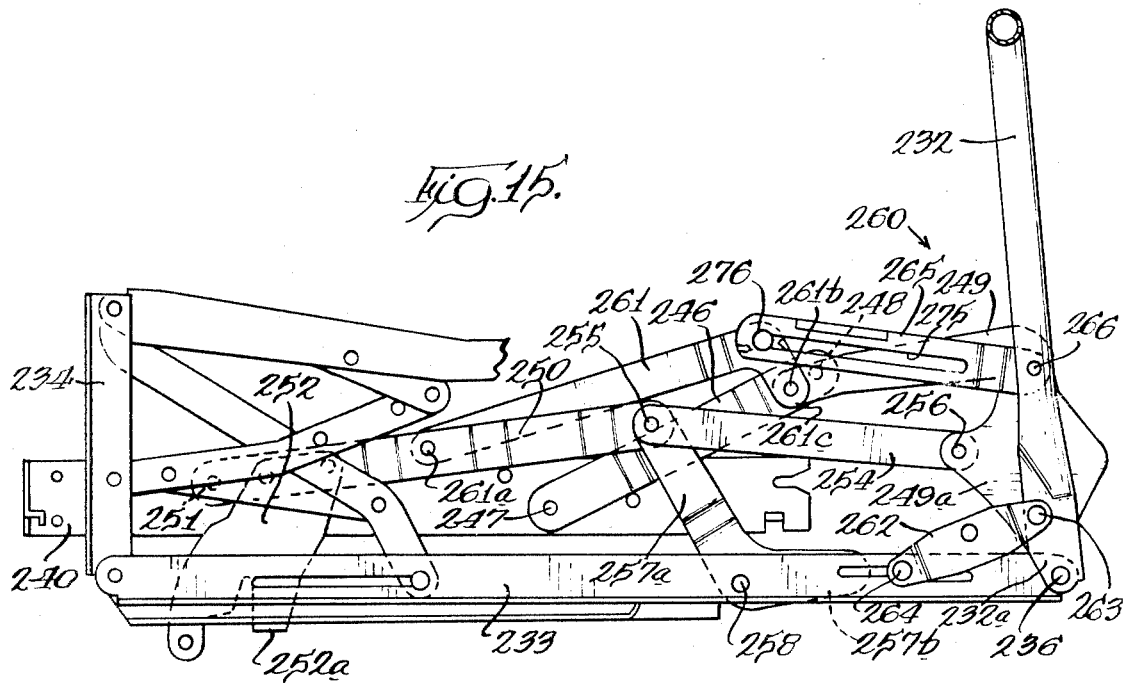
FIG. 15 is a side elevational view of the fixture embodiment of FIG. 14 in the fully folded or sofa position with certain parts broken away for clarity of illustration.

Connecting link means 260 is provided for controlling the movement of each bed section 232 from the fully folded position of FIG. 15, through the intermediate position of FIG. 16 to the fully extended position of FIG. 17. Connecting link means 260 eliminates the modifying links 67, 70 or 167, 170 of the previous embodiments and connects a guiding link 265 directly with control link 261. Guiding link 265 is pivotally connected at one end 266 to an intermediate portion of the side of the rear bed section 232, and said link 265 is connected to control link 261 by a lost motion connection means 271, including an elongate slot 275 in link 265 that is impaled by a pivot pin 276. Control link 261 includes an inwardly off-set, downwardly extending end portion 261c and pin 276 is carried by link 261 adjacent said end portion 261e, so that the rear bed section 232 can move relative to the other bed sections either during folding and unfolding of the bed, or when it is desired to elevate the rear bed section 232 to a position such as that shown in broken line in FIG. 17. As with the previous embodiments, a latch member 277 is pivotally mounted on pin 276 for releasably retaining the rear bed section in the broken line section of FIG. 17, as is shown in detail in FIG. 19. The latching action of cam member 277 is controlled by guide member 279 and release member 280 in the same manner as with the previous embodiments. The direct connection of rear bed section 232 to control link 261 through guiding link 265 provides an extremely stable support for the head bed section 232 when it is elevated. The downwardly extending portion 261c of control link 261 is connected at a pivot 261a to the portion 249b of second rear support link 249 that extends rearwardly of pivot 248. The rearwardly extending portion 249b of link 249 provides a positive control on the movement of links 261 and 265 which insures that the rear bed section 232 will be retained perpendicular to the inner bed section 233 until the mattress carried thereby has cleared the back rail, when the sofa bed is moved out of the fully folded or sofa position.

A further feature of the embodiment of FIGS. 14-19 is the provision of improved means for positively supporting the rear bed section 232 in the extended or bed position of the bed sections. As can be best seen in FIG. 18, a connecting strip 262 has inwardly off-set ends pivotally connected to head bed section 232 and inner bed section 233 at respective pivots 263 and 264. The side portions of head bed section 232 include flattened forward ends 232a, and a transverse member in the form of a pin 262b extends inwardly to overlie the flattened portion 232a or head bed section 232. Pin 262b is off-set from the pivotal connection 236 between the head bed section 232 and the inner bed section 233, so that when a force is applied to the head bed section, which would tend to pivot the same about pivot 232 in a clockwise direction relative to inner bed section 233, pin 262b will bear upon flattened head bed section portion 232a to effectively resist pivotal movement of the head bed section.

Figure 20:
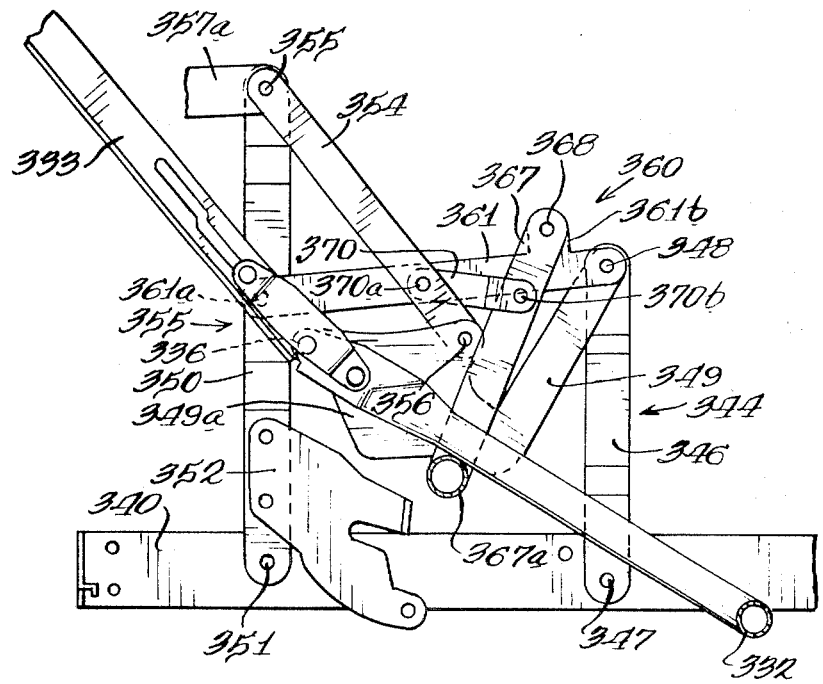
FIGS. 20 and 21 are side elevational views, similar to FIG. 16, illustrating further modifications of the sofa bed fixture in an intermediate position.

Turning now to FIG. 20, still another embodiment of the sofa bed fixture is illustrated, which is similar to the previously described embodiments, so that reference characters in the 300 series have been utilized to designate elements which correspond to those of the previous embodiments. The embodiment of FIG. 20 discloses a still further form of connecting link means 360 for controlling movement of a rear bed section 332 relative to the other bed sections, and while said bed section 332 cannot be retained in an elevated position such as shown in FIGS. 9 and 17, controlling link means 360 is substantially simpler in design than controlling link means 60, 160 or 260. In this structure a control link 361 is connected at its forward end at pivot 361a to a first front support link 350 and pivotally connected at its opposite end to a pivot connection 348 between first rear support link 346 and a second rear support link 349. A connecting link means 360 includes a first guiding link 367 connected at one end at pivot 368 to an upwardly extending portion 361b of control link 361. Connecting link means 360 also includes a second guiding link 370 connected at one end at pivot 370a to actuating link 354, and connected at its opposite end at pivot 370b to an intermediate portion of first guiding link 367. Guiding link 367 includes a transversely extending portion 367a that extends across the sofa bed for supporting the rear bed section 332 both in the fully extended position and in the sofa position. It will be understood that transversely extending link portion 367a also gradually lowers rear bed section 332 into the plane of the other bed sections during unfolding of the fixture, and also pulls said rear bed section substantially perpendicular with inner bed section 333 when the bed sections are moved into the fully folded or sofa position.

Figure 21:
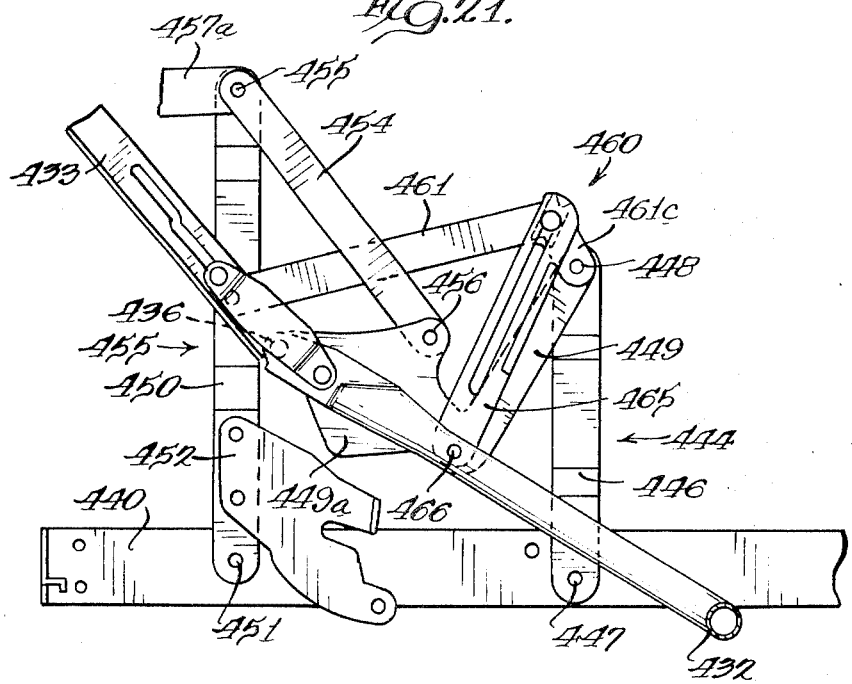

Referring now to FIG. 21, a still further embodiment of the invention is illustrated, and reference characters in the 400 series have been utilized to designate elements which correspond to those of the previous embodiments. The embodiment of FIG. 21 is substantially identical to that of FIGS. 14-19, except that a downwardly extending end portion 461c of a link 461 is connected directly to a pivotal connection 448 between a first rear support link 446 and a second rear support link 449. Furthermore, link 449 does not include an extension rearwardly of pivot 448 (as in the embodiment of FIGS. 14-19).

Referring now to FIGS. 22 and 23, another embodiment of the invention is illustrated that is similar to previously described embodiments, and reference characters in the 500 series are used to designate corresponding elements. The embodiment of FIGS. 22 and 23 is similar to the embodiment of FIGS. 14-19, in that a second rear support link 549 includes an extension 549b beyond a pivotal connection 548 to a first rear support link 546. A control link 561 has one end pivotally connected at 561a to an intermediate portion of a first front support link 550 and has its opposite end pivotally connected at the pivot 548 to the end of the first rear support link 546. A connecting link means 560 which includes control link 561 also includes a first guiding link 565 and second and third guiding, or modifying links, 567 and 570. The modifying link 567 is pivotally connected at 568 to an intermediate portion of control link 561. The modifying link 570 is pivotally connected at one end 570a to an intermediate portion of the modifying link 567, and at the opposite end to the extension portion 549b of second rear support link 549 at 572. The end of modifying link 567 remote from pivot 568 makes a lost motion sliding connection with the first guiding link 565 by a pin 567b that is slidably received within a slot 575 in link 565. Link 565 is pivotally connected at one end to a rear section 532 at a pivot 566 for controlling the movement of the rear bed section 532 when the fixture moves from the fully folded position of FIG. 22 to the fully extended position of FIG. 23.

The embodiment of FIGS. 22 and 23 represents a marked improvement over the previously described embodiments, in that the rear bed section 532 can occupy a more upright position behind the sofa frame back rest in the fully folded position, thus providing more clearance between the mattress carried by the fixture and the front lower cross rail of the back rest structure. As is evident from FIG. 22, when the fixture initially begins movement from the fully folded position, first front support link 550 begins to pivot in a counterclockwise direction about pivot 551 while first rear support link 546 pivots in a counterclockwise direction about pivot 547, and second rear support link 549 pivots in a clockwise direction about its pivotal connection 548 to first rear support link 546. During this initial movement, modifying link 570 and the extension 549b of the second rear support link 549 form a toggle-like connection, such that as the link 549 pivots in a clockwise direction, link 570 pivots in a counterclockwise direction about pivot 570a. As link 570 pivots in a counterclockwise direction, modifying link 567 is pivoted in a counterclockwise direction about pivot 568 until the pivots 570a, 572 and 548 are in line, and this latter action causes the guiding link 565 to pull the rear bed section 532 toward the inner bed section 533. It will be appreciated that because of this latter action, rear bed section 532 may assume a more upright position in the fully folded position of the fixture, and the toggle action of link 570 causes the head bed section to swing freely relative to the sofa frame without interfering with the back portion of the sofa frame as the fixture initially moves from the fully folded position. The remainder of the movement of the fixture from the fully folded position to the fully extended position, and the reverse movement from the fully extended position to the fully folded position, is substantially the same as that described with the previous embodiments, and need not be repeated here.

Figure 24:
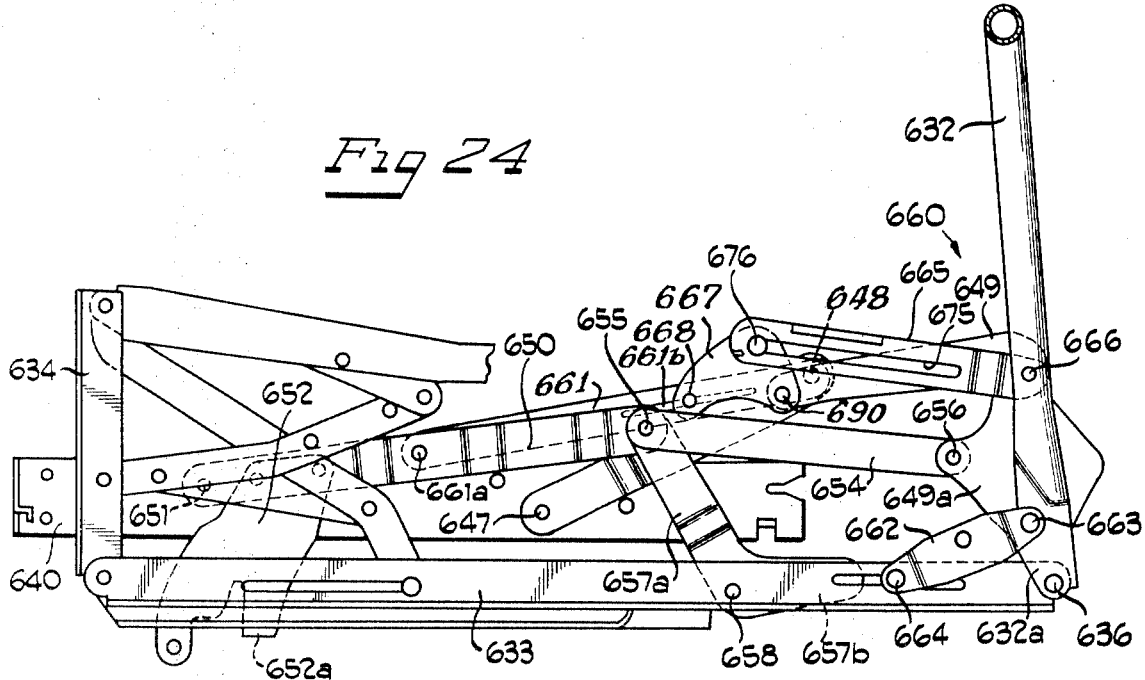
Figure 25:
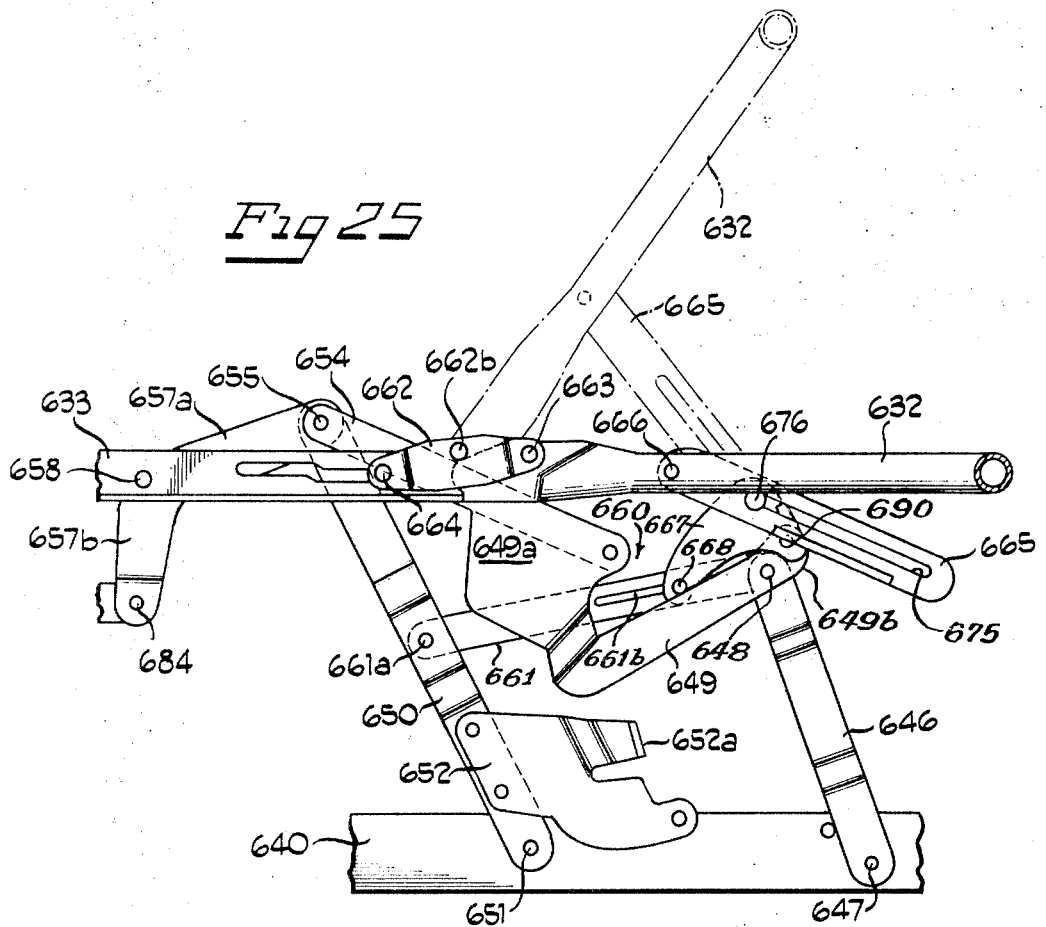

Referring now to FIGS. 24 and 25, still another embodiment of the invention is illustrated that is similar to previously described embodiments, so that similar reference numerals in the 600 series have been used to indicate elements that correspond to those of the previously described embodiments. The embodiment of FIGS. 24 and 25 is similar to the embodiments of FIGS. 14–19 and 22–23 to the extent that the second rear support link 649 includes an extension 649b rearwardly of a pivotal connection 648 to the end of a first rear support link 646. The embodiment of FIGS. 24 and 25 represents a substantial improvement over previously described embodiments, and particularly over the embodiment illustrated in FIGS. 22 and 23, in that the connecting link means 660 of the embodiment of FIGS. 24 and 25 accomplishes substantially the same improved function as the embodiment of FIGS. 22 and 23 with one less link. To this end, a connecting link means 660 includes a control link 661 pivotally connected at one end at 661a to an intermediate portion of a first front support link 650, and pivotally connected at its other end at a pivot 648 to the end of first rear support link 646. The connecting link means 660 also includes a generally triangularly shaped modifying link 667, which makes a sliding, lost motion connection with a control link 661 by having a pin 668 at one corner of link 667 slidably received in an elongate slot 661b in link 661. Another corner of modifying link 667 is pivotally connected to the extension 649b of second rear support link 649 by a pivot 690, and the third corner of link 667 makes a lost motion sliding connection with a first guiding link 665 by having a pivot pin 676 slidably received in an elongate slot 675 in link 665. Thus, second guiding link 667 functions as a bell crank which is pivoted at 690 and has pin and slot connections in its two arms. Link 665 is pivotally connected at one end to the rear bed section 632 by pivot 666, so that said bed section may be elevated and latched in an inclined position, as is illustrated in broken lines in FIG. 25.

When the fixture of FIGS. 24 and 25 is initially moved from the fully folded position of FIG. 24 toward the fully extended position of FIG. 25, second rear support link 649 pivots in a clockwise direction relative to first rear support link 646 about pivot 648. This latter movement causes pivot 690 to move up and to the left, as viewed in FIG. 24, which causes modifying link 667 to pivot slightly in a counterclockwise direction about pivot 668, and which also causes pin 668 to slide somewhat to the left in slot 661b. Since pivot 690 is substantially in line with pivot 668 in the fully folded position, while pivot 676 is positioned approximately 45° between a vertical line and a line between pivots 668 and 690, the initial movement of the fixture from the fully folded position causes pivot 676 to move to the left (as viewed in FIG. 24) faster than pivot 690. This latter movement causes guiding link 665 to pull hte rear bed section 632 toward the inner bed section 633, so that in the fully folded position of the fixture, the rear bed section 632 may be positioned perpendicular to the inner bed section 633.

All of the embodiments except those of FIGS. 14 to 21 include modifying links in the connecting link means, so that the movement of the control link (61, 161, 561, 661) is not transmitted directly to the guiding link (65, 165, 565, 665). As a result, the rear bed section may occupy a folded position which is at an angle of at least 90° with respect to the inner bed section and may move around the breast rail 22c and clear of the rear of the sofa frame as the bed is unfolded.

Although the embodiments of FIGS. 22–23 and 24–25 are illustrated with the rear bed section folded at an angle of less than 90° to the inner bed section, this relationship may be varied merely by lengthening the guiding link (565 or 665), and the rear bed section can still be moved around the breast rail and clear of the rear of the sofa frame because of the action of the modifying links 570 and 567, or the modifying link 667, as the case may be.

Conversely, in the embodiments of FIGS. 14 to 21 the undesirably small angle of the rear bed section with respect to the inner bed section cannot be corrected merely by lengthening the guiding link (265, 465 or 367) because to do so would cause interference between the rear bed section and the rear of the sofa frame during folding and unfolding of the bed.

What is claimed is:

1. In a sofa bed which includes a sofa frame having back and side frame members and a front rail which define a rectangular storage enclosure, a folding bed structure including an inner bed section and a rear bed section pivotally connected to the inner bed section, and primary linkage means including rear support link means, front support link means and actuating link means operatively connecting said rear and front support link means to move the inner bed section between a generally horizontal retracted position in the bottom of the storage enclosure and a horizontal extended position in which it is elevated above the storage enclosure and projects over the front rail, said actuating link means including a control link which moves in a substantially translatory fashion between said retracted and extended positions of said inner bed section, connecting link means which includes said control link for pivoting the rear bed section substantially 90° on the inner bed section between an upright retracted position and a normally horizontal extended position, said connecting link means comprising, in combination:

a guiding link which is directly operatively connected to an intermediate portion of the rear bed section;

and means operatively connecting said guiding link to a part of said control link which is to the rear of said front support link means, said operatively connecting means including a lost motion connection between said rear bed section and a part of said connecting link means.

2. The combination of claim 1 in which there is a pin on said part of the control link, and the guiding link is directly connected to said pin.

3. The combination of claim 2 in which the guiding link has a longitudinal slot which is impaled by the pin to provide a direct lost motion connection between the guiding link and the control link.

4. The combination of claim 2 in which the guiding link is pivoted on said pin and slidingly engages the rear bed section.

5. The combination of claim 4 in which the guiding link has a transversely extending portion which underlies the rear bed section to make the sliding engagement therewith.

6. The combination of claim 4 which includes a second guiding link pivoted at one end to said guiding link and also pivoted to the first actuating link.

7. The combination of claim 1 in which the connecting link means includes modifying link means connected to said part of the control link and to the guiding link.

8. The combination of claim 7 in which the modifying link means includes a first modifying link pivotally mounted on said part of the control link, a second modifying link pivotally connected to the front support link means and to the first modifying link, and in which the guiding link is directly operatively connected to one of said modifying links.

9. The combination of claim 8 in which the first modifying link is pivotally connected intermediate the ends of the second modifying link and the guiding link is directly operatively connected to the end of said modifying link remote from the front support link means.

10. The combination of claim 9 in which the guiding link has a longitudinal slot which engages a stud on the second modifying link.

11. The combination of claim 8 in which the second modifying link has an end remote from its pivotal connection to the front support link means which is pivotally connected intermediate the ends of the first modifying link, and in which the guiding link is directly operatively connected to an end of the first modifying link which is remote from the pin on the control link.

12. The combination of claim 11 in which the guiding link has a longitudinal slot which engages a stud on the first modifying link.

13. The combination of claim 8 in which the guiding link has a longitudinal slot which engages a stud on said one of said modifying links.

14. The combination of claim 7 in which the modifying link means includes a first modifying link connected to said part of the control link and making a pin and slot connection with the guiding link.

15. The combination of claim 14 which includes a second modifying link pivotally connected at one end to the rear support link means and at the other end to the first modifying link.

16. The combination of claim 14 which includes a second modifying link pivotally connected at one end to the front support link means and at the other end to the first modifying link.

17. The combination of claim 14 in which the first modifying link is a bell crank which is pivoted on the rear support link means and has one arm which makes a pin and slot connection with said part of the control link and a second arm which makes said pin and slot connection with the guiding link.

18. The combination of claim 17 in which there is a longitudinal slot in said part of the control link, and in which the bell crank has a pin on its first arm engaging said slot.

19. The combination of claim 18 in which there is a longitudinal slot in the guiding link, and in which the bell crank has a pin in its second arm engaging said slot in the guiding link.

20. The combination of claim 1 in which an invertible, generally triangularly shaped link is pivotally connected at one corner to said rear bed section and is pivotally connected at another corner to said inner bed section, one of the pivotal connections of said link being a lost motion connection.

21. The combination of claim 1 in which means is provided for preventing said rear bed section from moving toward said other bed sections in said retracted position.

22. The combination of claim 1 in which a link is connected between said rear and inner bed sections adjacent the pivotal connection therebetween, with a slot in one of said sections defining lost motion connection means, said link being pivotally connected to the other of said sections and having a pin slidably received in said slot, and wherein a detent surface is provided in said slot for retaining said pin to prevent movement of said rear bed section toward said other bed sections in said retracted position.

23. The combination of claim 22 in which said slot includes a first portion extending in one direction from said detent surface and adapted to slidably receive said pin when said connecting link means is disconnected from said rear bed section and said rear bed section is folded upon said other bed sections, said slot including a second portion extending from said detent surface in a direction opposite from said first portion to slidably receive said pin when said rear bed section is elevated relative to said other bed sections in the extended positions of said bed sections, and wherein said connecting link means includes latch means for releasably retaining said rear bed sections in the elevated position.

24. The combination of claim 23 in which said first and second slot portions are vertically off-set from one another, with said detent surface being provided on one side of said slot at the junction between said portions.

25. The combination of claim 24 in which a cam surface is provided on the side of said slot opposite from said detent surface for guiding said pin from said slot first portion to said slot second portion.

26. In a sofa bed which includes a sofa frame having back and side frame members and a front rail which define a rectangular storage enclosure, a folding bed structure including an inner bed section and a rear bed section pivotally connected to the inner bed section, and primary linkage means including rear support link means, front support link means and actuating link means operatively connecting said rear and front support link means to move the inner bed section between a generally horizontal retracted position in the bottom of the storage enclosure and a horizontal extended position in which it is elevated above the storage enclosure and projects over the front rail, said actuating link means including a control link which moves in a substantially translatory fashion between said retracted and extended positions of said inner bed section, connecting link means for pivoting the rear bed section substantially 90° on the inner bed section between an upright retracted position and a normally horizontal extended position, said connecting link means comprising in combination:

a guiding link which is directly operatively connected to an intermediate portion of the rear bed section;

and modifying link means operatively connected to the guiding link and to the actuating link means between said front support link means and said rear support link means, whereby said guiding link derives its motion indirectly from said actuating link means.

27. The combination of claim 26 in which the modifying link means includes a first modifying link connected to the actuating link means, a second modifying link connected to said first actuating link and to one of the support link means, and in which the guiding link makes a pin and slot connection with one of the modifying links.

28. The combination of claim 27 in which the second modifying link is connected to the front support link means.

29. The combination of claim 28 in which the first modifying link is directly connected to the guiding link and the second modifying link is connected to the first modifying link.

30. The combination of claim 28 in which the second modifying link is directly connected to the guiding link and the first modifying link is connected to the second modifying link.

31. The combination of claim 27 in which the second modifying link is connected to the rear support link means.

32. The combination of claim 26 in which the modifying link means comprises a bell crank pivoted on the rear support link means, said bell crank having a first arm operatively connected to the actuating link means and a second arm operatively connected to the guiding link.

33. The combination of claim 32 in which the operative connection of each arm of the bell crank is a pin and slot connection.

34. In a sofa bed which includes a sofa frame having back and side frame members and a front rail which define a rectangular storage enclosure, a folding bed structure including an inner bed section and a rear bed section pivotally connected to the inner bed section, and primary linkage means including rear support link means, front support link means and actuating link means operatively connecting said rear and front support link means to move the inner bed section between a generally horizontal retracted position in the bottom of the storage enclosure and a horizontal extended position in which it is elevated above the storage enclosure and projects over the front rail, said actuating link means including a control link which moves in a substantially translatory fashion between said retracted and extended positions of said inner bed section, connecting link means for pivoting the rear bed section substantially 90° on the inner bed section between an upright retracted position and a normally horizontal extended position, said connecting link means comprising, in combination:

a guiding link which is directly operatively connected to an intermediate portion of the rear bed section;

and modifying link means which makes a pin and slot connection with the guiding link and which is also directly operatively connected with the rear support link means.

35. The combination of claim 34 in which the modifying link means includes a first modifying link which makes the pin and slot connection with the guiding link and a pivotal connection with the control link, and a second modifying link connected to said first modifying link and to a rear support link.

36. The combination of claim 34 in which the modifying link means comprises a bell crank pivotally mounted on a rear support link, said bell crank having a first arm operatively connected to the actuating link means and a second arm which makes the pin and slot connection with the guiding link.

37. The combination of claim 36 in which the first arm of the bell crank makes a pin and slot connection with the control link.

References Cited

UNITED STATES PATENTS

| | | | |
|---|---|---|---|
| 3,284,811 | 11/1966 | Rogers | 5—13 |
| 3,284,814 | 11/1966 | Mikos | 5—13 |
| 3,298,041 | 1/1967 | Rogers | 5—13 |
| 3,380,083 | 4/1968 | Mikos | 5—13 |

CASMIR A. NUNBERG, Primary Examiner

U.S. Cl. X.R.

5—31